No. 697,365. Patented Apr. 8, 1902.
C. J. REYNOLDS.
TRACE HOLDER AND CAST-OFF.
(Application filed May 14, 1901.)
(No Model.)
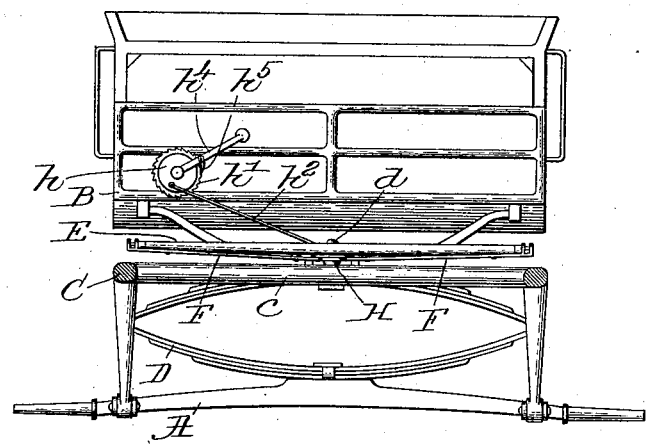
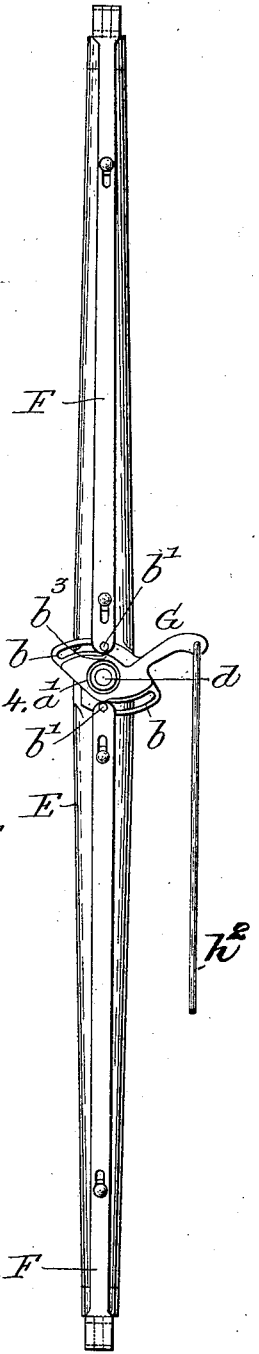
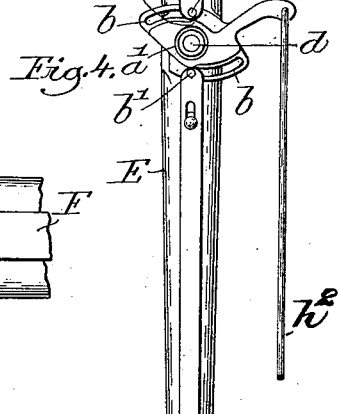
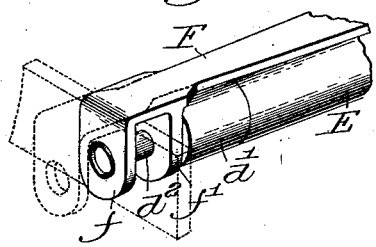
Witnesses:
Fred S. Greenleaf
W. C. Lunsford
Inventor:
Charles J. Reynolds.
by Crosby & Gregory
Attys.
THE NORRIS PETERS CO., PHOTO-LITHO., WASHINGTON, D. C.

UNITED STATES PATENT OFFICE.

CHARLES J. REYNOLDS, OF BOSTON, MASSACHUSETTS, ASSIGNOR OF TWO-THIRDS TO DAVID M. WAITT, OF SOMERVILLE, AND BENJAMIN F. FREETHY, OF BOSTON, MASSACHUSETTS.

TRACE HOLDER AND CAST-OFF.

SPECIFICATION forming part of Letters Patent No. 697,365, dated April 8, 1902.

Application filed May 14, 1901. Serial No. 60,219. (No model.)

*To all whom it may concern:*

Be it known that I, CHARLES J. REYNOLDS, a citizen of the United States, residing at Boston, in the county of Suffolk and State of Massachusetts, have invented an Improvement in Trace Holders and Cast-Offs, of which the following description, in connection with the accompanying drawings, is a specification, like letters on the drawings representing like parts.

This invention has for its object the production of novel means for holding the traces of a harness securely in connection with the whiffletree and for releasing the traces to free the horse in case of any accident where it is desired that the horse be detached from the vehicle.

In my invention I have provided the whiffletree at each end with a sliding cast-off which embraces a trace, said device having operatively connected with it a suitable actuator under the control of the driver to instantly slide the trace embraced by it from the end of the stud which retains the trace in engagement with the whiffletree.

Figure 1 shows the front end of a wagon box and axle, the wagon-box being sustained by suitable springs, and part of a pair of shafts; Fig. 2, an under side view of the central part of the whiffletree enlarged and detached to show the actuator; Fig. 3, an enlarged detail showing one end of the whiffletree with the cast-off in full lines in operating position and by dotted lines in its inoperative position. Fig. 4 is an under side view of the entire whiffletree.

Referring to the drawings, the axle A, the box B, the shafts C, coupled with the axle, and the spring D are and may be of any usual or suitable construction, and the shafts may be united to the axle with any usual coupling.

The whiffletree E is united with the cross-bar $c$ of the shafts by a suitable bolt $d$, there being interposed between the whiffletree and the said cross-bar any usual wear-iron. The whiffletree has at each end a suitable ferrule, as $d'$, and a stud $d^2$, the latter when standing in the usual slit or eye at the end of the trace $a$ holding the trace securely and enabling the horse to draw the vehicle. I have provided the whiffletree at its under side at each end with a cast-off F, represented as a bar forked at its ends to present two ears $f f'$, with a space between in which is placed the trace end, said ears having suitable holes to embrace the stud $d^2$ when the cast-off is in working position. Each cast-off has coöperating with its inner end a suitable actuator, in this present instance of my invention represented as a lever G, shown as having its fulcrum on the bolt uniting the whiffletree to the cross-bar $c$. The actuator is provided at its under side, as herein represented, with a circular groove $a'$, concentric with the opening therein, which receives the bolt $d$, said groove receiving in it the usual circular projection formed upon a wear-plate H of usual construction, secured to the cross-bar $c$, and in common use the other part of the wear-plate, in this instance being the under side of the actuator and its groove $a'$. The bolt uniting the whiffletree to the cross-bar of the shafts passes through, as stated, the actuator and also the part H of the wear-plate before being passed through the cross-bar. The actuator also has, as herein represented, suitable eccentric slots, as $b$, which receive studs or projections $b'$ of the cast-off. The outer wall of each of these slots has a notch, as $b^2$, (shown best in Fig. 2 by dotted lines,) and the under side of the actuator is provided with cams $b^3$ to meet the inner end of the cast-off as the actuator comes into its normal or locked position, (see full lines, Fig. 2,) said projection sliding the actuator outwardly for a slight distance far enough to place the stud of the cast-off in the notch. In this condition the forked ends of the cast-off embrace the pin, and there is a slight space between the inner side of the inner ear of the cast-off and the end of the whiffletree. While the stud of the cast-off stands in the notch leading from the slot, the actuator and the cast-off are both locked, so that they cannot be accidentally moved to release the traces. Instead of this particular form of locking means I may employ any other suitable means for locking the actuator and cast-off in their operative position. When the actuator occupies the dotted-line position shown in Fig. 2, the cast-off occupies the dotted-line position, Fig. 3, the inner face of the innermost ear $f'$ of the cast-off then occupying a position just within the end of the stud, and in such condition the trace may be inserted in the space between the ears of the cast-off and the actuator be moved into its full-line position, Fig. 2, causing the ears of the cast-off to move laterally to place the trace farther on the stud, the outermost ear $f$ passing over and embracing the stud, the ears carrying the trace with it and holding the trace on the stud.

In case of accident, to detach the horse from the vehicle it is only necessary to turn the actuator and slide the cast-off, embracing the trace between its eyes, longitudinally in a direction to force the trace from the stud.

I have shown herein one suitable means for moving the actuator, viz: I have provided the body of the vehicle with a suitable sheave $h$, having a connected ratchet-toothed plate $h'$, and have joined to this sheave one end of a suitable connection, as a rope or wire $h^2$, which at its other end is joined with the actuator. Upon the stud, which serves as a fulcrum for the sheave, I have mounted a lever $h^4$, having a pawl $h^5$, which engages the teeth of the ratchet-plate, and whenever it becomes necessary to move the cast-off the driver merely depresses the lever and imparts a rotative movement to the sheave, thus winding the flexible connection thereon and moving the actuator to cause the cast-off to remove the trace from its stud.

Having described my invention, what I claim, and desire to secure by Letters Patent, is—

1. A whiffletree having at its end a stud to enter a hole in a trace, a cast-off composed of a sliding bar mounted upon the whiffletree, said bar being provided at its outer end with a fork to embrace a trace, the arms of said fork having holes to embrace the stud, a pivoted actuating device provided with a slot eccentric to the pivot thereof, a stud on said sliding bar the walls of said slot being arranged to engage said stud to positively move the sliding bar lengthwise of the whiffletree in either direction.

2. A whiffletree having at its end a stud to enter a hole in a trace, a cast-off composed of a sliding bar mounted upon the whiffletree, and having trace-engaging means, a pivoted actuating device provided with a slot eccentric to the pivot thereof, a stud on said sliding bar the walls of said slot being arranged to engage said stud to positively move the sliding bar lengthwise of the whiffletree in either direction, and a locking device to lock the actuator in position to hold the trace upon the stud.

3. A whiffletree having at its end a stud to enter a hole in a trace, a sliding bar mounted upon the whiffletree and provided with means to embrace a trace, a pivoted actuating device provided with a slot eccentric to the pivot thereof and having a recess at one end of the slot and a cam adjacent said recess, said bar being provided with a stud to engage the eccentric slot, and adapted to be moved by the said cam to cause the stud to be locked in the recess.

In testimony whereof I have signed my name to this specification in the presence of two subscribing witnesses.

CHARLES J. REYNOLDS.

Witnesses:
GEO. W. GREGORY,
BENJ. F. FREETHY.